G. F. Evans,
Automatic Fan,
N° 81,353. Patented Aug. 25, 1868.
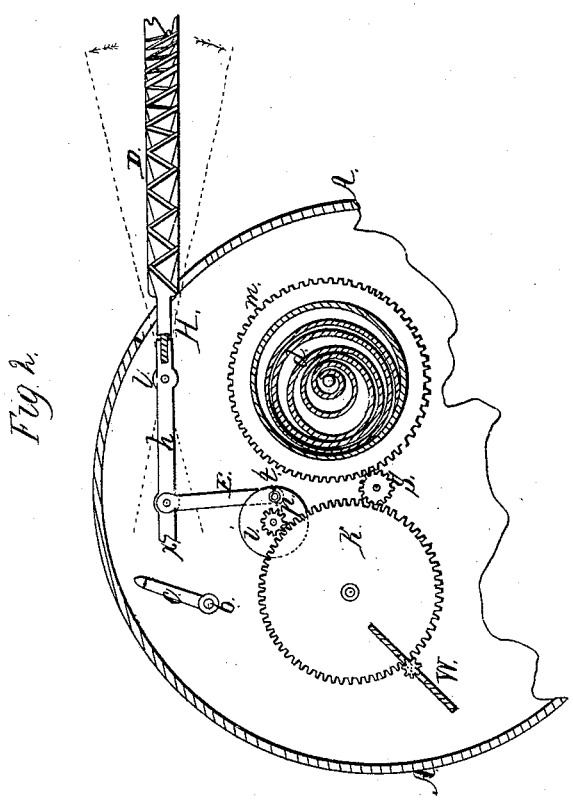
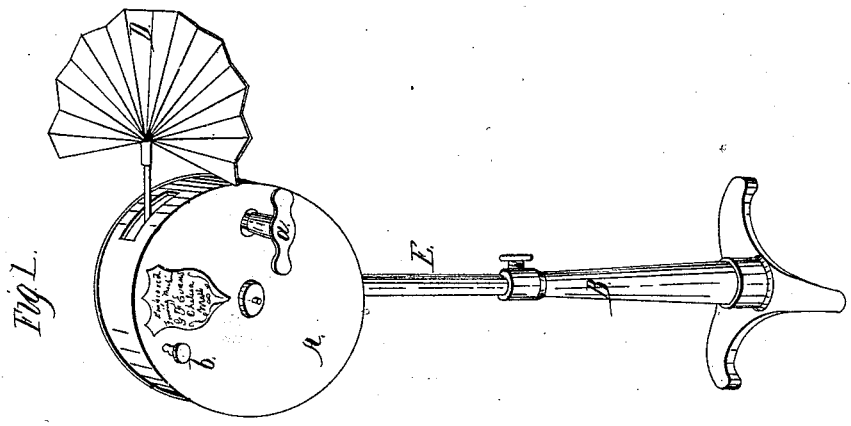
Witnesses:
Alex N. Rodman
A. F. Butterworth
Inventor:
George F. Evans, by
Carroll D. Wright Atty

United States Patent Office.

GEORGE F. EVANS, OF CHELSEA, MASSACHUSETTS, ASSIGNOR TO HIMSELF AND GEORGE P. RILEY, OF SAME PLACE.

Letters-Patent No. 81,353, dated August 25, 1868.

IMPROVED FANNING-MACHINE.

*The Schedule referred to in these Letters Patent and making part of the same.*

---

Be it known that I, GEORGE F. EVANS, of Chelsea, in the county of Suffolk, and State of Massachusetts, have invented a new and improved Fanning-Machine; and I do hereby declare that the following is a full and exact description thereof, reference being had to the accompanying drawings, making part of this specification, in which—

Figure 1 represents a perspective view of a complete fanning-machine.

Figure 2 represents a sectional view of the drum or case of the fanning-machine, showing the motive-power and method of operating the fan.

The object of my invention is to produce a cheap, durable, and efficient portable fanning-machine, for use in hospitals, sick-rooms, barbers' saloons, and all places where it would be desirable to use a fan.

By the use of my invention, the labor of a nurse or attendant upon a sick person may be made much lighter, while the pleasure and comfort derived from its use, in many instances, make a cheap and durable portable fanning-machine of public value.

The nature of my invention consists in so arranging a fan, of any suitable shape or material, worked by means of a spring, or its equivalent, as motive-power, upon a stand, as to make the machine portable, and easily adjusted to any circumstances.

In the drawings annexed, A is a drum, which contains the works for operating the fan. This drum may be of the shape shown in the drawings, or it may have any convenient shape, or may be a square box. B is an adjustable stand, into which is fixed the rod E, sustaining drum A.

D shows the fan. $d$ is a watch-spring, powerful enough to furnish the motive-power for the operation of the machine. This spring $d$ is wound up by crank $a$. The spring $d$ is placed within cogged barrel-wheel $m$. The wheel $m$, turned by the expansion of the spring $d$, turns pinion S, operating wheel K, which moves pinion-wheel $i$. To pinion-wheel $i$ is attached crank $e$, by crank-pin $t$. The rotation of wheel $i$ actuates crank $e$, to which is attached arm $h$. This arm has its fulcrum at $l$. The fan D is attached to arm $h$ at H. It is evident, then, that when the crank $e$ is actuated by the clock-movements described, the fan will receive an up-and-down fanning motion. This motion may be secured by several different ways, but the use of the crank $e$ is a convenient way of producing it. The arm $h$ and the fan D, in weight, must be equipoised, and the movements regulated by fly-wheel W. In a full-sized fanning-machine, the motion is a sweep-motion, so desirable in a fan, and which produces the desired effect. C is a stop-work, by which the fan can be stopped at pleasure, by catching the arm $e$ into lock $x$, on the end of arm $h$, by means of thumb-screw $b$.

This fan will continue in operation for a long or short time, according to the strength and size of the spring $d$, but I make the machine to run at least six hours, as a convenient time.

I do not claim any new motive-power, or any new mechanical movement; neither do I claim the stand B, for it is old and well known; but having described my improvement in fanning-machines,

What I claim as my invention, and desire to secure by Letters Patent, is—

The fan D, operating as described, in combination with arm $h$, connecting-rod $e$, pinion-wheel $i$, crank-pin $t$, large wheel K, pinion S, barrel-wheel $m$, spring $d$, fan-wheel W, thumb-screw $b$, and crank $a$, for winding, all arranged and operating relatively to each other, substantially as described, and for the purpose set forth.

The above invention was made by me, February 3, 1868.

In testimony whereof, I have signed my name to this specification in the presence of two subscribing witnesses.

GEORGE F. EVANS.

Witnesses:
CARROLL D. WRIGHT,
ALEX. N. REDMAN.